United States Patent
Brewer

(10) Patent No.: US 12,530,149 B2
(45) Date of Patent: Jan. 20, 2026

(54) METHOD OF SUBMITTING WORK TO FABRIC ATTACHED MEMORY

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 473 days.

(21) Appl. No.: 17/823,462

(22) Filed: Aug. 30, 2022

(65) Prior Publication Data

US 2024/0069802 A1   Feb. 29, 2024

(51) Int. Cl.
G06F 3/06 (2006.01)

(52) U.S. Cl.
CPC .......... *G06F 3/0659* (2013.01); *G06F 3/0611* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,122,229 B2 | 2/2012 | Wallach et al. | |
| 8,156,307 B2 | 4/2012 | Wallach et al. | |
| 8,205,066 B2 | 6/2012 | Brewer et al. | |
| 8,423,745 B1 | 4/2013 | Brewer | |
| 8,561,037 B2 | 10/2013 | Brewer et al. | |
| 9,710,384 B2 | 7/2017 | Wallach et al. | |
| 10,740,243 B1 * | 8/2020 | Benisty | G06F 3/061 |
| 10,969,996 B1 * | 4/2021 | Noiman | G06F 3/0659 |
| 10,990,391 B2 | 4/2021 | Brewer | |
| 10,990,392 B2 | 4/2021 | Brewer | |
| 2008/0270708 A1 | 10/2008 | Warner et al. | |
| 2012/0079177 A1 | 3/2012 | Brewer et al. | |
| 2013/0332711 A1 | 12/2013 | Leidel et al. | |
| 2015/0143350 A1 | 5/2015 | Brewer | |

(Continued)

FOREIGN PATENT DOCUMENTS

| | | |
|---|---|---|
| CN | 117631969 | 3/2024 |
| WO | 2010051167 | 5/2010 |

(Continued)

*Primary Examiner* — Arpan P. Savla
*Assistant Examiner* — Edmund H Kwong
(74) *Attorney, Agent, or Firm* — Schwegman Lundberg & Woessner, P.A.

(57) ABSTRACT

A method performed by a distributed computing system includes receiving a work packet from a separate computing device via a fabric interconnect at a command manager (CM) of a memory controller of a fabric attached memory (FAM) device, wherein the work packet includes a memory access to be performed by a FAM computing resource local to the FAM device; determining a work class of the work packet; placing the work packet in a CM work queue local to the CM for the work class when space is available in the CM work queue for the work class; and when the CM work queue for the work class is full, placing the work packet in a destination work queue according to an address included in the work packet, wherein the destination queue is implemented in a memory array of the FAM device external to the memory controller.

18 Claims, 4 Drawing Sheets

(56) References Cited

U.S. PATENT DOCUMENTS

| | | | |
|---|---|---|---|
| 2015/0169254 A1* | 6/2015 | Authement | G06F 3/0635 |
| | | | 711/103 |
| 2015/0206561 A1 | 7/2015 | Brewer et al. | |
| 2019/0042214 A1 | 2/2019 | Brewer | |
| 2019/0171604 A1 | 6/2019 | Brewer | |
| 2019/0243700 A1 | 8/2019 | Brewer | |
| 2019/0303154 A1 | 10/2019 | Brewer | |
| 2019/0324928 A1 | 10/2019 | Brewer | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0167098 A1* | 5/2020 | Shah | G06F 3/0644 |
| 2021/0055964 A1 | 2/2021 | Brewer | |
| 2021/0064374 A1 | 3/2021 | Brewer | |
| 2021/0064435 A1 | 3/2021 | Brewer | |
| 2021/0149600 A1 | 5/2021 | Brewer | |
| 2021/0297354 A1* | 9/2021 | Zemach | H04L 47/521 |
| 2022/0391136 A1* | 12/2022 | Veluswamy | G06F 3/0659 |

FOREIGN PATENT DOCUMENTS

| | | |
|---|---|---|
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

* cited by examiner

METHOD OF SUBMITTING WORK TO FABRIC ATTACHED MEMORY

GOVERNMENT RIGHTS

This invention was made with Government support under Agreement No. DE-AC05-76RL01830, awarded by the US Department of Energy. The Government has certain rights in the invention.

TECHNICAL FIELD

Embodiments of the disclosure relate generally to computing systems that include Fabric Attached Memory (FAM) and more specifically to systems and methods to reduce latency of memory requests to FAM.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, various embodiments discussed in the present document.

DETAILED DESCRIPTION

Embodiments of the present disclosure are directed to Fabric Attached Memory (FAM) devices. FAM devices are connected to a computer system by a system-wide fabric. Communication among the devices using the fabric can have higher latency than direct memory connection.

Figure 1:
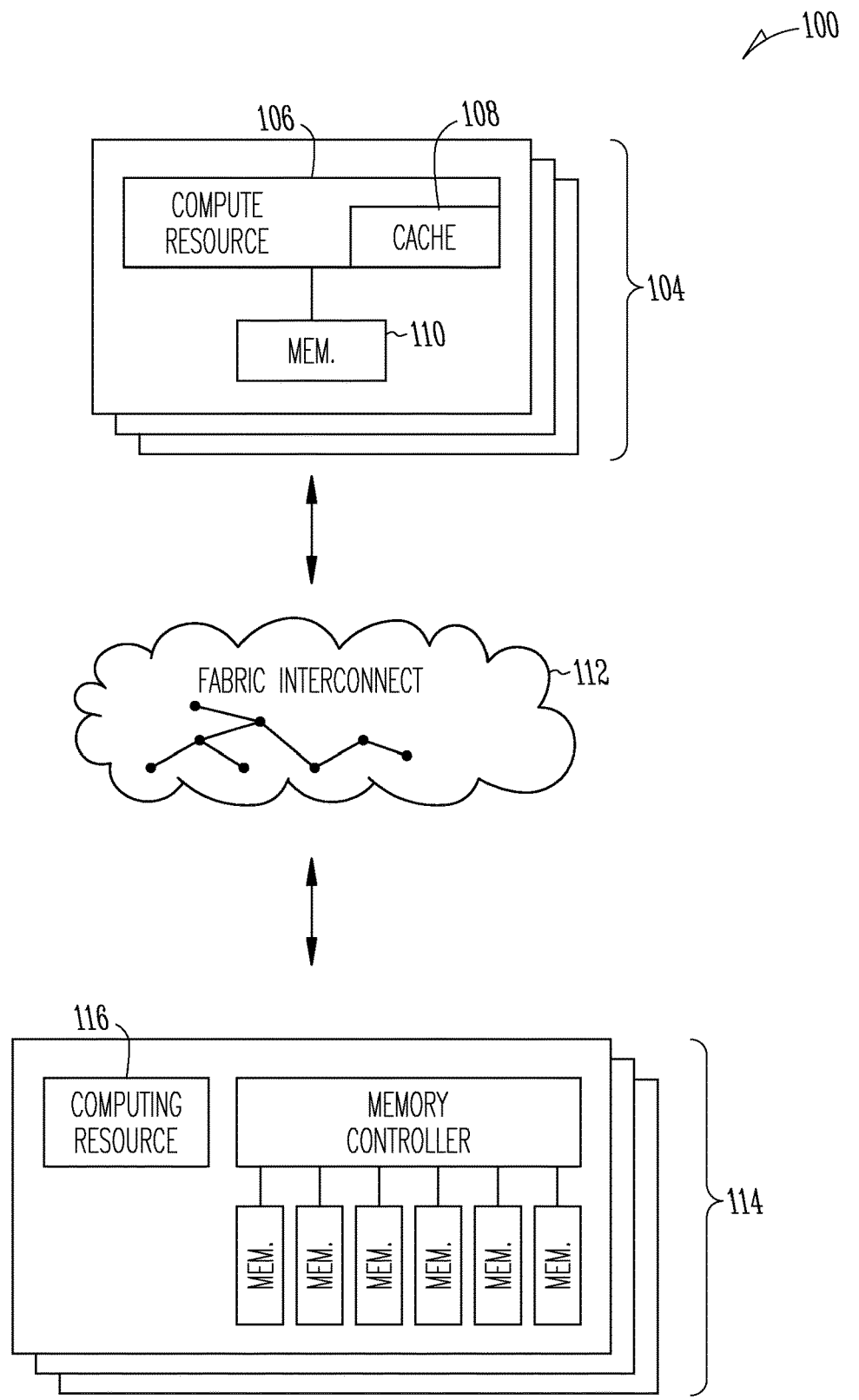
FIG. 1 is an example of a distributed computing system, in accordance with some examples described herein.

FIG. 1 shows an example of a distributed computing system for performing complex tasks autonomously in real time. The system 100 includes multiple host nodes 104 that include compute resources 106 and memory directly connected to the compute resource 106 to perform tasks or subtasks assigned to the host node 104. A compute resource 106 includes processing circuitry (e.g., a central processing unit (CPU), graphics processing unit (GPU), FPGA, etc.), and the memory can include cache memory 108 and other memory 110 that can be volatile or non-volatile. The memory directly connected to the compute resources 106 is high bandwidth memory that provides memory access with high bandwidth and low latency.

In distributed computing systems it is desired for system resources to share data. The host nodes 104 can communicate using a data fabric interconnect 112 (e.g., Gen-Z, Peripheral Component Interconnect Express (PCIe), Compute Express Link (CXL), etc.) and the host nodes 104 may cooperate to perform a complex task with functions of the task or subtasks assigned to one or more of the host nodes 104.

The system 100 includes Fabric Attached Memory (FAM) that includes one or more FAM devices 114 that are remote or disaggregated from the host nodes 104. Memory requests to a FAM device 114 can involve longer latency than directly connected memory. For example, for a fetch-and-increment operation, a compute resource 106 of a host node 104 would request a memory access to retrieve the data, form the result of the operation using the data, and place the result in the cache 108 local to the compute resource 106. Because of the additional protocol steps in accessing data to bring the data over the fabric interconnect 112, there is a longer latency in the fetch-and-increment operation than if the memory was directly attached.

Near-data computing addresses the latency problem by placing a FAM computing resource 116 (e.g., a processor core) local to the FAM device 114 on the memory-side of the fabric interconnect 112. To send work to the FAM computing resource 116, the host nodes 104 send work packets over the fabric interconnect 112 to the FAM device 114. The FAM computing resource 116 performs the work (e.g., the fetch-and-increment operation) requested by a specific processor of a host node 104. There is no need for the data to pass through the fabric interconnect 112.

However, there is still higher latency in using the FAM device 114 as compared to using directly connected memory. These higher latencies increase the importance of having a highly efficient work submittal mechanism to a FAM device 114. Ideally, a mechanism can submit work to a FAM device 114 with a single request to memory. Additionally, the ability to submit work and know that the FAM device 114 has space to hold the work packet before the work is submitted is important to minimize latency from having to resubmit the work if the space to hold the work packet is full.

Figure 2:
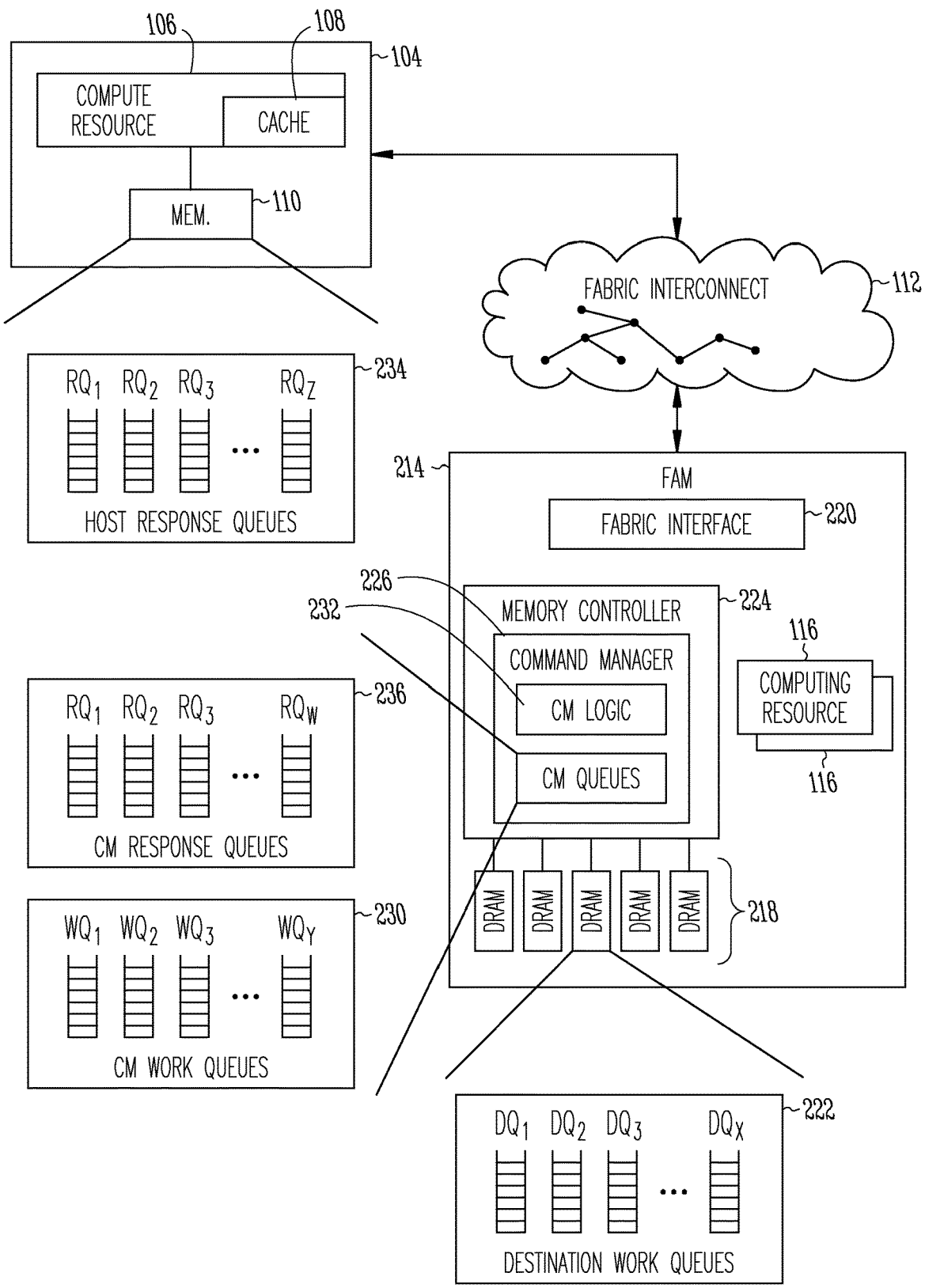
FIG. 2 is a block diagram of an example of a Fabric Attached Memory (FAM) device, in accordance with some examples described herein.

FIG. 2 is a block diagram of an example of a FAM device 214 that provides a mechanism for source work initiators (e.g., host processor threads or applications of the host nodes 104) to use a single request to submit work to the FAM device 214. The FAM device 214 includes a memory array 218 that includes memory cells, a fabric interface 220 to the fabric interconnect 112, and at least one FAM computing resource 116 located on the memory-side of the fabric interface 220. In an example, the fabric interface 220 is a CXL interface. The FAM device may include multiple computing resources. Each FAM computing resource 116 may include one or more hardware processors. The FAM device 214 of FIG. 2 may include computing resources that are dedicated for a specific task. For example, the FAM device 214 may include a FAM computing resource 116 dedicated for atomic operations and a separate FAM computing resource 116 for merge operations. A work class can be associated with each computing resource 116 of the FAM device 214.

The memory array 218 is shown as having DRAM memory cells, but the memory array 218 may include one or more of SDRAM, SRAM, RRAM, MRAM, flash memory, ROM, and NVDIMM. Destination work queues 222 are configured in the memory array 218. The destination work queues 222 store work packets received from a source initiator and the work packets are performed by the FAM computing resource 116. An application in a host node 104 can be viewed as a FAM tenant and each tenant may include one or more processing threads. If there are T tenants, N threads per tenant, and R FAM computing resources 116, then there would be a total of (T×N×R) destination work queues in the memory array 218.

The FAM device 214 includes a memory controller 224 operatively coupled to the memory array 218 and the FAM computing resource 116. The memory controller 224 includes a command manager (CM) 226. The CM 226 includes CM work queues 230 and CM logic circuitry 232. The CM work queues 230 are local to the CM 226 and memory controller 224, and may reside on the same integrated circuit (IC) as the memory controller 224. In an example, the CM work queues 230 are implemented in SRAM of the memory controller 224. The CM 226 can include a set of CM work queues 230 for each FAM tenant, and the set of work queues 230 for a FAM tenant can include a separate CM work queue 230 for each resource type so that work packets are queued separately to each FAM computing resource 116. The total number of CM work queues 230 can be the number of FAM tenants times the number of computing resource types or (T×R) CM work queues 230. In an illustrative example intended as non-limiting, if there are 512 threads, there are 512 CM work queues for each computing resource or T=512. In some examples, a single destination work queue 222 is assigned to an application and all source work initiators of an application use the work queue with a runtime thread safe mechanism.

The CM logic circuitry 232 routes work packets received at the fabric interface 220 to the appropriate work queue. The CM logic circuitry 232 can include one or more hardware processors running software or firmware to perform the functions of the CM 226 described. In some examples, the CM logic circuitry 232 includes an application specific integrated circuit (ASIC) or field programmable gate array (FPGA) that implements a state machine to perform the functions described.

Figure 3:
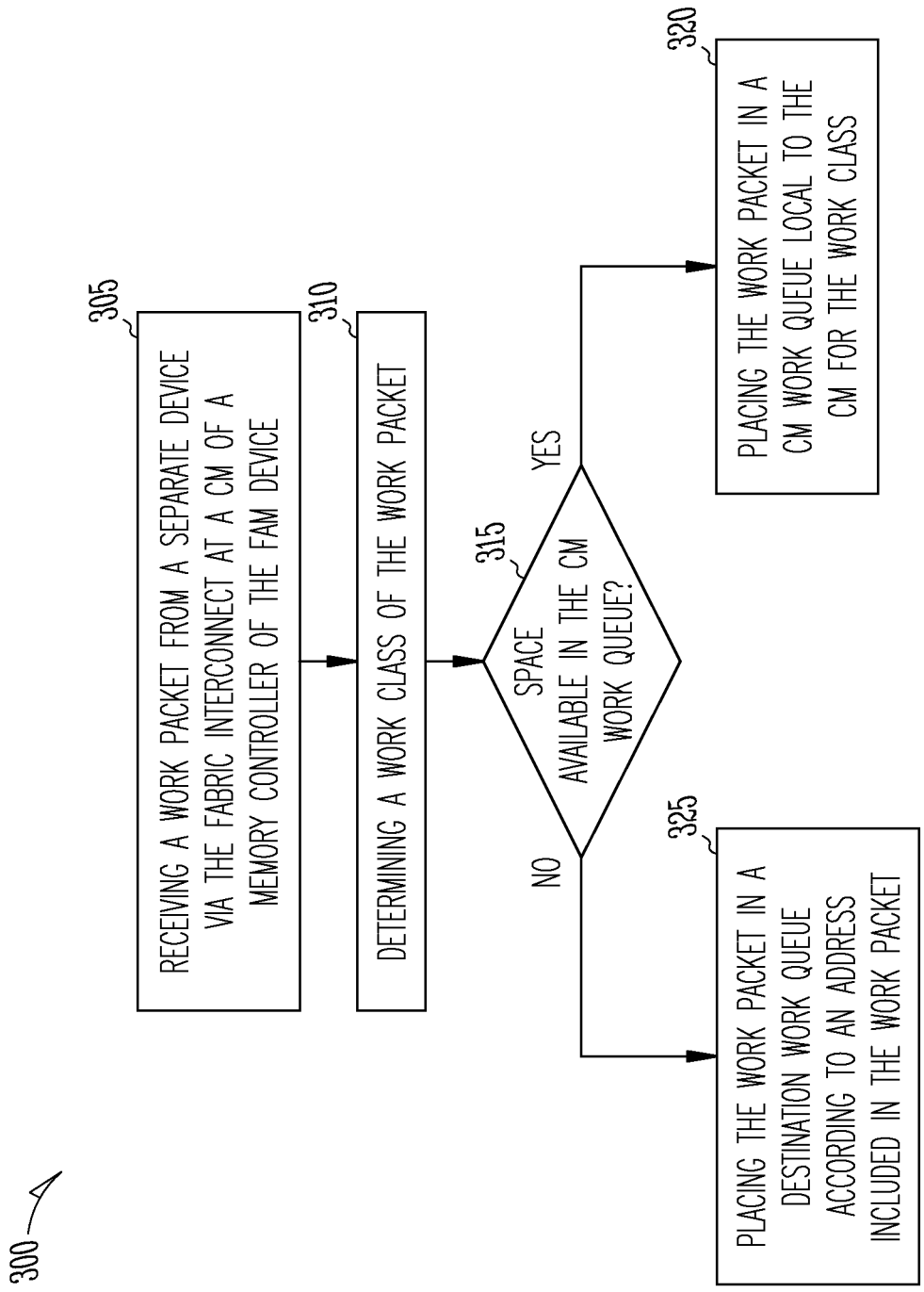
FIG. 3 is a flow diagram of a method performed by a distributed computing system, in accordance with some examples described herein.

FIG. 3 is a flow diagram of a method 300 performed by a distributed computing system that includes multiple host nodes and at least one FAM device connected to the host nodes by a fabric interconnect. The FAM device may be the FAM device 214 in the example of FIG. 2.

At block 305, a work packet is received from a separate device via the fabric interconnect at a CM of a memory controller of the FAM device 214. The separate device may be a host node 104 or the separate device may be another FAM device. The work packet includes a work request to be performed by the FAM computing resource 116 that includes a memory access operation. The work packet may include a command for an atomic operation. In another example, the work packet may include a CXL command or PCIe command that includes a 64 Byte (64B) write.

At block 310, the CM logic circuitry 232 determines the work class of the work packet. Determining the work class may include the CM logic circuitry 232 decoding the work packet (e.g., decoding the payload) to determine which FAM computing resource 116 will perform the work packet.

At block 315, the CM logic circuitry 232 determines whether space for the work packet is available in the CM work queue 230 for that work class. In some examples, the CM logic circuitry 232 determines whether space for the work packet is available in the CM work queue 230 corresponding to the work class for a specific FAM tenant.

At block 320, the CM logic circuitry 232 writes the work packet to the corresponding CM work queue 230 for the work class when space is available in that CM work queue 230. At block 325, the CM logic circuitry 232 writes the work packet to a destination work queue 222 in the memory array 218 (e.g., a DRAM queue) when the CM work queue 230 for the work class is full. The destination work queue 222 that receives the work packet is determined by the CM logic circuitry 232 using according to the memory address in the work packet.

Note that the work packet is always written to some work queue either in the CM 226 or in the memory array 218. A full set of destination work queues 222 are included in the memory array 218 to guarantee that some work queue of the FAM device 214 will have space for the work packet. This allows the processor of a host node 104 to submit work to the FAM device 214 as a single message from host node 104 to CM 226 without waiting for a response message from the memory controller 224 as to the status of the work packet (e.g., a submit it and forget it communication). Thus, the work is initiated with minimal latency and initiating the work uses minimal system fabric bandwidth.

The work packet is processed according to the protocol of the work queues. The CM work queues 230 can be viewed as a work queue cache of the CM 226. When a CM work queue 230 receives a work packet, the CM 226 determines the source work initiator that it belongs to from the write request address of the packet. The write request address is to the base of a memory-based destination work queue 222. A set of one or more source work initiators are associated with each FAM tenant. Within a CM 226, a separate set of work class queues are allocated per FAM tenant. By determining the source work initiator, the CM 226 can determine to which FAM tenant the work packet belongs. The work class of the work packet can be determined by examining content within the 64B work packet's write payload. Once the FAM tenant and work class are determined, the CM determines if the target CM work queue 230 is full. If the target CM work queue is full, then the work packet is written to the memory-based destination work queue 222 associated with the work packet's write request address. The CM 226 maintains read and write indices for each of the internal and external work queues. These indices can be kept in CM local state.

The CM 226 maintains the status of all FAM computing resources 116 within the FAM device 214. When a FAM computing resource 116 is available, the CM 226 will check if a CM work queue 230 has work for the free resource. If a match of a free resource and work packet is found, then the work is popped from the CM work queues 230 and forwarded to the idle FAM computing resource.

When a work packet is removed from the CM work queue 230, the read index of the associated destination work queue 222 is incremented (even if the work packet was not written to the destination work queue 222). Once the read index is incremented, the CM 226 writes the updated read index value to the local memory of the host node 104 to allow the host node 104 to use the updated read index and its copy of the write index to determine work queue full status.

Because the CM work queues 230 are in the memory controller 224, there may be lower latency in the work packet getting to the FAM computing resource 116 than if the work packet is stored in a destination work queue 222. Because there are fewer CM work queues than destination work queues, when a CM work queue has an empty spot, a work packet from a set of destination work queues could fill that spot. If space in the CM work queue 230 for the work class becomes available after the work packet is written in a destination work queue, the CM logic circuitry 232 may read the work packet from a destination work queue 222 into the CM work queue 230. The CM logic circuitry 232 may include a separate processor or state machine dedicated for pulling work packets from the destination work queues 222. All destination work queues 222 with the same tenant and resource work class as the CM work queue 230 are candidates for filling the empty CM work queue spot. A round robin arbitration scheme may be used to decide which destination work queue 222 entry is used to fill the CM work queue 230 available spot.

The work packets may include work requests that may need to be executed in order. This means that sometimes the CM logic circuitry 232, after writing a packet into a destination work queue 222, writes the next received work packet in the destination work queue 222 to maintain order of the work requests, even though there may be space in the CM work queues 230. Execution order of the packets can be maintained using first-in/first-out ordering rules through the work queues, making sure that ordering is maintained when transitioning between writing and reading from the CM and destination work queues.

When a FAM computing resource 116 completes a work request, the CM 226 receives an indication of completion of the work request. The CM 226 includes a set of CM response queues 236. Each CM work queue 230 has a paired CM response queue 236. In some examples, the CM 226 maintains sufficient information from the work packet to determine the paired response queue 236. In some examples, the CM 226 uses separate state traveling with the work packet to determine the paired response queue 236. A response packet may be sent to the source work initiator of the work request when the work request is competed. Note that the response is not that the work packet was accepted, but that the work was completed.

If the source work initiator resides in a host node 104, a response packet may be transferred from the CM 226 to the host response queue 234 in local memory 110 of the host node 104. When writing the host completion queue (e.g., using a 64B write), the CM 226 sets a valid bit in the response packet. The CM 226 also updates (e.g., increments) a write index pointer for the host response queue 234. The CM 226 writes the value of the write pointer to the host memory for the host node 104 to determine that the host response queue 234 has space available. When a host node 104 determines whether it can send a work packet to a destination work queue, it checks that the host response queue 234 has space available for the response packet paired with the work packet. The host node 104 polls the valid bit of the host response queue entry. If the valid bit is set, the host node 104 pulls the work response packet out of the host response queue 234 and into the cache 108 of the host node 104. The host node 104 updates (e.g., increments) a read index pointer, and the host node 104 sends the read index pointer value to the CM 226.

Receiving the value of the read index pointer tells the CM 226 that the space in the host completion queue is freed up. The CM 226 tracks the value of the write index pointer and the read index pointer. When the write index pointer equals the value of the read index pointer, the host response queue is empty. It can be seen that sending the response is also sent as a single message without the CM 226 needing to wait for a response message from the host node 104.

According to some examples, each host queue can optionally be operated in a deferred memory write compatible mode. In this mode the host node 104 does not maintain work queue full status. Instead, the host node 104 blindly sends a work packet to a destination work queue 222 using a CXL.io/uio deferred memory write transaction, and CM 226 may place the work packet in a CM work queue 230 if space is available. The transaction's response indicates if the write completed successfully. In this mode, the host node 104 may stall until it receives the completion response to know if the work submittal was successful. When a host node operates in deferred memory write compatible mode, the updated read index does not need to be sent to the host node 104.

Work packets can be received by the FAM device 214 from a host node 104 (i.e., source-to-device work submittal) or from another FAM device (device-to-device work submittal). The protocol of the message sending is similar, and a work packet is sent and received using a single message. The major difference is that instead of a source work initiator being a host process thread or application, the source work initiator is a FAM device/tenant/work class. Thus, each FAM device 214 can have device-to-device queues for each source FAM device, per FAM device tenant, and per work class. For example, if there are 256 FAM devices, and each FAM device can have 8 tenants, and there are 4 work classes, then each FAM device can have 8192 device-to-device CM work queues 230 and CM response queues 234.

For device-to-device work submission, a work packet may be received by a first CM 226 of a first FAM device 214 from a second CM of a second FAM device wishing to make use of the FAM computing resource 116. The work packet is written into the CM work queue 230 of the first CM 226, and the work request is performed by the FAM computing resource 116 of the first FAM device 214. The first CM 226 receives the response from the FAM computing resource 116 into a CM response queue 234.

Device-to-device work submittal can be performed using either CXL.io or CXL.uio memory write transactions. The CXL.io transactions have the benefit of one directional communication (no response) and the guarantee of ordered transactions from source to destination. The CXL.uio transactions have the benefit of a response to know that the work was delivered, and the unordered transaction allows the system fabric to take advantage of all paths from source FAM device to the destination FAM device.

For device-to-device work completion, sending the completion response message to the second CM 226 is similar to sending the response message to a host node 104. The difference is that there may be only one CM response queue at the second CM for all of the work classes, but still a separate response queue per source FAM device and per FAM device tenant.

The first CM 226 maintains a write index pointer for the second CM and updates the write index pointer when writing the completion response message to the CM response queue of the second CM. When the second CM pulls the response from the CM response queue it sends a read index pointer to the first CM 226. The first CM uses the write index pointer and the read index pointer to determine if the CM response queue of the second CM has space available.

The systems, devices, and methods described herein provide a mechanism to submit work to a FAM device with a single request to memory. The ability to submit work and know that the FAM device has space to hold the work packet before the work is submitted minimizes having to resubmit the work on a work queue full condition.

Figure 4:
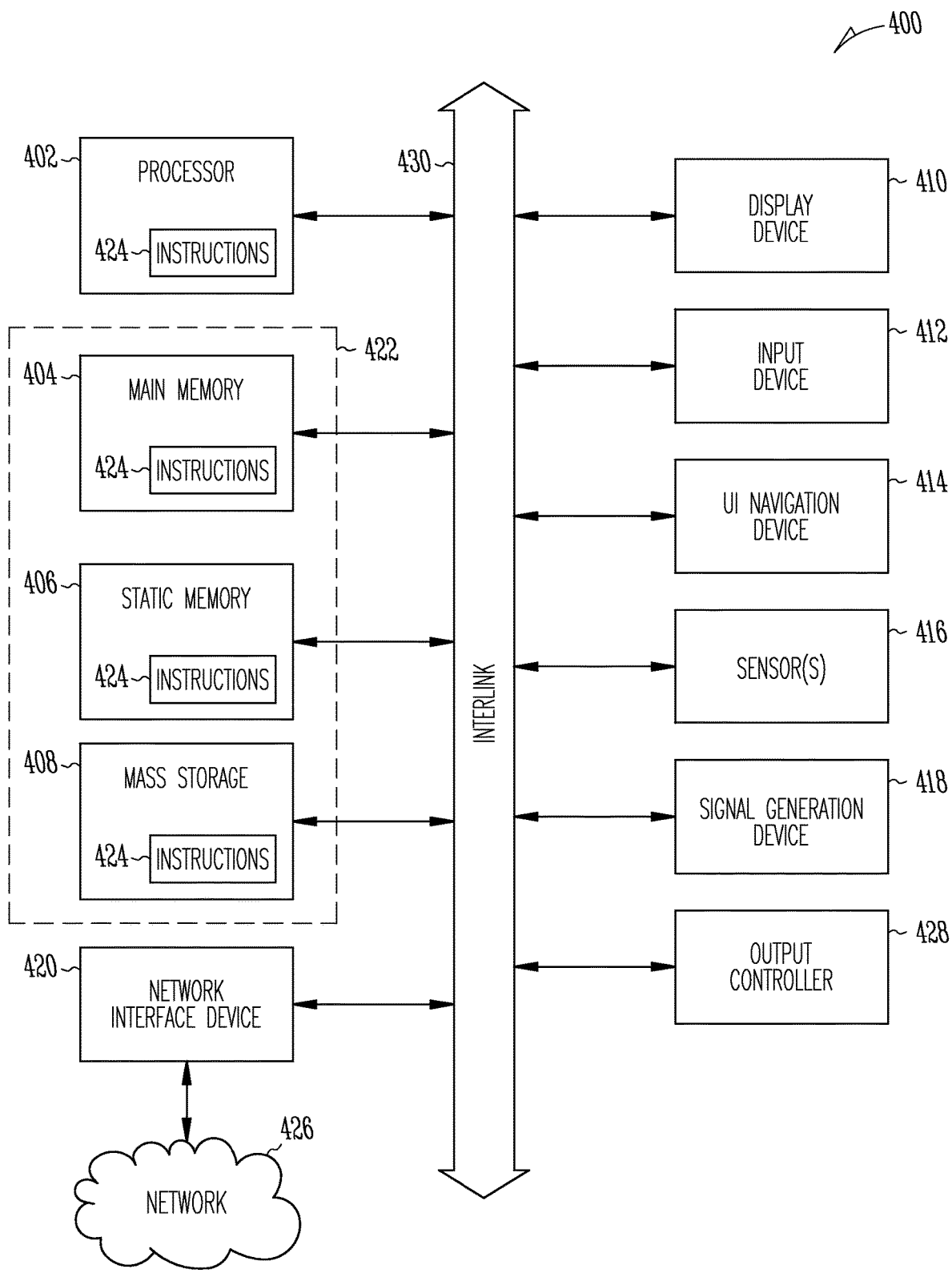
FIG. 4 illustrates a block diagram of an example machine, in accordance with some examples described herein.

FIG. 4 illustrates a block diagram of an example machine 400 upon which any one or more of the techniques (e.g., methodologies) described herein may be performed. Examples, as described herein, may include, or may operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 400 may include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drives, tape drives, flash storage, or other block devices) some or all of which may communicate with each other via an interlink (e.g., bus) 430. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 may be, or include, a machine readable medium 422 on which is stored one or more sets of data structures or instructions 424 (e.g., software) embodying or utilized by any one or more of the techniques or functions described herein. The instructions 424 may also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 may constitute the machine-readable media 422. While the machine-readable medium 422 is illustrated as a single medium, the term "machine readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 422 may be representative of the instructions 424, such as instructions 424 themselves or a format from which the instructions 424 may be derived.

This format from which the instructions 424 may be derived may include source code, encoded instructions (e.g., in compressed or encrypted form), packaged instructions (e.g., split into multiple packages), or the like. The information representative of the instructions 424 in the machine readable medium 422 may be processed by processing circuitry into the instructions to implement any of the operations discussed herein. For example, deriving the instructions 424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 424.

In an example, the derivation of the instructions 424 may include assembly, compilation, or interpretation of the information (e.g., by the processing circuitry) to create the instructions 424 from some intermediate or preprocessed format provided by the machine readable medium 422. The information, when provided in multiple parts, may be combined, unpacked, and modified to create the instructions 424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 424 may be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 includes subject matter (such as a method performed by a distributed computing system that includes one or more host nodes and at least one fabric attached memory (FAM) device connected to the one or more host nodes by a fabric interconnect) comprising receiving a work packet from a separate device via the fabric interconnect at a command manager (CM) of a memory controller of the FAM device, wherein the work packet includes a memory access to be performed by a FAM computing resource local to the FAM device; determining a work class of the work packet; placing the work packet in a CM work queue local to the CM for the work class when space is available in the CM work queue for the work class; and when the CM work queue for the work class is full, placing the work packet in a destination work queue according to an address included in the work packet, wherein the destination queue is implemented in a memory array of the FAM device external to the memory controller.

In Example 2, the subject matter of Example 1 optionally includes the CM processing the work packet received from the separate device without the memory controller sending status of the received work packet to the separate device.

In Example 3, the subject matter of one or both of Examples 1 and 2 optionally includes including reading a work packet from the destination work queue into the CM work queue for the work class when space in the CM work queue becomes available.

In Example 4, the subject matter of any combination of Examples 1-3 optionally includes loading the work packet into the destination queue in response to the CM work queue being full; and loading a subsequent work packet into the destination queue according to a work packet order when space becomes available in the CM work queue.

In Example 5, the subject matter of one or any combination of Examples 1-4 optionally includes determining the work class from a write payload of the work packet.

In Example 6, the subject matter of one or any combination of Examples 1-5 optionally includes determining the work packet contains an atomic operation to be performed by the FAM computing resource, and placing the work packet in a CM work queue for the atomic operation.

In Example 7, the subject matter of one or any combination of Examples 1-6 optionally includes determining the work packet includes a compute express link (CXL) command.

In Example 8, the subject matter of one or any combination of Examples 1-7 optionally includes determining the work packet includes a peripheral component interconnect express (PCIe) command.

In Example 9, the subject matter of one or any combination of Examples 1-8 optionally includes receiving the work packet from a host node of the distributed computing system; sending a response packet indicating completion of the work packet by the FAM computing resource to a host response queue of the host node, wherein the response packet includes a valid status bit; updating, by the CM, a write index of the host response queue; and comparing the write index of the host response queue to a read index of the host response queue to determine if the host response queue has space available.

In Example 10, the subject matter of one or any combination of Examples 1-9 optionally includes the host node polling an entry of the host response queue for the valid status, the entry of the host response queue corresponding to the read index; and updating the read index in response to valid status and sending the read index to the CM.

In Example 11, the subject matter of one or any combination of Examples 1-10 optionally includes receiving the work packet at a first CM of a first FAM device of the computing system from a second CM of a second FAM device of the computing system; receiving, in a CM response queue of the first CM, indication of completion of the work packet from the FAM computing resource of the first FAM device; and sending, by the first CM, a response packet to a CM response queue of the second CM.

In Example 12, the subject matter of one or nay combination of Examples 1-11 optionally includes updating, by the first CM, a write index of the CM response queue of the second CM; receiving, by the first CM from the second CM, a read index of the CM response queue of the second CM; and determining, by the first CM, if the CM response queue of the second CM has space available.

Example 13 includes subject matter (such as a fabric attached memory (FAM) device of a distributed computing system) or can optionally be combined with one or any combination of Examples 1-12 to include such subject matter, comprising a memory including a memory array of memory cells; a fabric interface to a fabric interconnect of the distributed computing system; at least one FAM computing resource located on a memory-side of the fabric interface; at least one destination work queue implemented in the memory array and configured to store work packets performable by the at least one FAM computing resource; and a memory controller operatively coupled to the memory and the at least one FAM computing resource. The memory controller includes a Command Manager (CM) that includes a CM work queue local to the memory controller and configured to store work packets performable by the at least one FAM computing resource and CM logic circuitry. The CM logic circuitry is configured to decode a work packet received via the fabric interface to determine a class of work of the work packet; store the work packet in the CM local work queue if space is available; and store the work packet in the destination work queue external to the CM when the CM local work queue is full.

In Example 14, the subject matter of Example 13 optionally includes CM logic circuitry configured to load a work packet from the destination work queue into the CM work queue for the work class when space in the CM work queue becomes available.

In Example 15, the subject matter of one or both of Examples 13 and 14 optionally includes CM logic circuitry is configured to determine that the CM work queue is full; load the work packet into the destination queue in response to the CM work queue being full; determine that the CM work queue has space available; and load a subsequent work packet into the destination queue according to a work packet order when in response to the space becoming available in the CM work queue.

In Example 16, the subject matter of one or any combination of Examples 13-15 optionally includes multiple CM work queues including a CM work queue for each work class of each host application of the host nodes of the distributed computing system.

In Example 17, the subject matter of one or any combination of Examples 13-16 optionally includes CM logic circuitry configured to send a response packet to a host response queue of the host node, wherein the response packet includes a valid status for the completion response for the work packet; update a write index of the host response queue; and compare the write index of the host response queue to a read index of the host response queue to determine if the host response queue has space available.

In Example 18, the subject matter of one or any combination of Examples 13-17 optionally includes multiple CM work queues including a CM work queue for each work class of each of other FAM devices of the distributed computing system.

In Example 19, the subject matter of one or any combination of Examples 13-18 optionally includes a CM response queue to receive an indication of completion of the work packet from the FAM computing resource; and CM logic circuitry configured to send a response packet to a CM response queue of another CM of another FAM device; update a write index of the CM response queue of the other CM; receive a read index of the CM response queue of the other CM; and compare the write index of the CM response queue of the other CM to the read index of the CM response queue of the other CM to determine if the other CM response queue of the other CM has space available.

Example 20 includes subject matter (or can optionally be combined with one or any combination of Examples 1-19 to include such subject matter) such as a non-transitory computer readable storage medium including instructions, that when performed by processing circuitry of a memory controller of a fabric attached memory (FAM) device, cause the FAM device to perform acts comprising receiving a work packet from a source device via the fabric interconnect, wherein the work packet includes a memory access to be performed by a FAM computing resource local to the FAM device; determining a work class of the work packet; placing the work packet in a command manager (CM) work queue local to the memory controller for the work class when space is available in the CM work queue for the work class; when the CM work queue for the work class is full, placing the work packet in a destination work queue according to an address included in the work packet, wherein the destination queue is implemented in a memory array of the FAM device external to the memory controller; and providing the work packet to the FAM computing resource without sending status of the received work packet to the source device.

These non-limiting Examples can be combined in any permutation or combination.

What is claimed is:

1. A method performed by a distributed computing system that includes one or more host nodes and fabric attached memory (FAM) devices connected to the one or more host nodes by a fabric interconnect, the method comprising:
receiving a work packet via the fabric interconnect at a first command manager (CM) of a memory controller of a first FAM device of the computing system from a second CM of a second FAM device of the computing system, wherein the work packet includes a memory access to be performed by a FAM computing resource local to the FAM device;
determining a work class of the work packet;
placing the work packet in a CM work queue local to the first CM for the work class when space is available in the CM work queue for the work class; and
when the CM work Queue for the work class is full, placing the work packet in a destination work queue according to an address included in the work packet, wherein the destination queue is implemented in a memory array of the FAM device external to the memory controller;
receiving, in a CM response queue of the first CM, indication of completion of the work packet from the FAM computing resource of the first FAM device; and sending, by the first CM, a response packet to a CM response queue of the second CM.

2. The method of claim 1, including the first CM processing the work packet received from the separate device without the memory controller sending status of the received work packet to the separate device.

3. The method of claim 1, including reading a work packet from the destination work queue into the CM work queue for the work class when space in the CM work queue becomes available.

4. The method of claim 1, including:
loading the work packet into the destination queue in response to the CM work queue being full; and
loading a subsequent work packet into the destination queue according to a work packet order when space becomes available in the CM work queue.

5. The method of claim 1, wherein determining the work class of the work packet includes determining the work class from a write payload of the work packet.

6. The method of claim 1, wherein determining the work class of the work packet includes determining the work packet contains an atomic operation to be performed by the FAM computing resource, and placing the work packet in a CM work queue for the atomic operation.

7. The method of claim 1, wherein determining the work class of the work packet includes determining the work packet includes a compute express link (CXL) command.

8. The method of claim 1, wherein determining the work class of the work packet includes determining the work packet includes a peripheral component interconnect express (PCIe) command.

9. The method of claim 1, wherein the receiving the work packet includes receiving the work packet from a host node of the distributed computing system, and the method further includes:
sending a response packet indicating completion of the work packet by the FAM computing resource to a host response queue of the host node, wherein the response packet includes a valid status bit;
updating, by the first CM, a write index of the host response queue; and
comparing the write index of the host response queue to a read index of the host response queue to determine if the host response queue has space available.

10. The method of claim 9, including:
the host node polling an entry of the host response queue for the valid status, the entry of the host response queue corresponding to the read index; and
updating the read index in response to valid status and sending the read index to the first CM.

11. The method of claim 1, including:
updating, by the first CM, a write index of the CM response queue of the second CM;
receiving, by the first CM from the second CM, a read index of the CM response queue of the second CM; and
determining, by the first CM, if the CM response queue of the second CM has space available.

12. A fabric attached memory (FAM) device of a distributed computing system, the FAM device comprising:
a memory including a memory array of memory cells;
a fabric interface to a fabric interconnect of the distributed computing system;
at least one FAM computing resource located on a memory-side of the fabric interface;
at least one destination work queue implemented in the memory array and configured to store work packets performable by the at least one FAM computing resource;
a memory controller operatively coupled to the memory and the at least one FAM computing resource, wherein the memory controller includes a command manager (CM); and
wherein the CM includes:
a CM work queue local to the memory controller and configured to store work packets performable by the at least one FAM computing resource;
a CM response queue to receive an indication of completion of the work packet from the FAM computing resource; and
CM logic circuitry configured to:
decode a work packet received via the fabric interface to determine a class of work of the work packet;
store the work packet in the CM local work queue if space is available;
store the work packet in the destination work queue external to the CM when the CM local work queue is full;
send a response packet to a CM response queue of another CM of another FAM device;
update a write index of the CM response queue of the other CM;
receive a read index of the CM response queue of the other CM; and
compare the write index of the CM response queue of the other CM to the read index of the CM response queue of the other CM to determine if the other CM response queue of the other CM has space available.

13. The FAM device of claim 12, wherein the CM logic circuitry is configured to load a work packet from the destination work queue into the CM work queue for the work class when space in the CM work queue becomes available.

14. The FAM device of claim 12, wherein the CM logic circuitry is configured to:
determine that the CM work queue is full;
load the work packet into the destination queue in response to the CM work queue being full;
determine that the CM work queue has space available; and
load a subsequent work packet into the destination queue according to a work packet order when in response to the space becoming available in the CM work queue.

15. The FAM device of claim 12, wherein the CM includes multiple CM work queues including a CM work queue for each work class of each host application of the host nodes of the distributed computing system.

16. The FAM device of claim 12, wherein the CM logic circuitry is configured to:
send a response packet to a host response queue of the host node, wherein the response packet includes a valid status for the completion response for the work packet;
update a write index of the host response queue; and
compare the write index of the host response queue to a read index of the host response queue to determine if the host response queue has space available.

17. The FAM device of claim 12, wherein the CM includes multiple CM work queues including a CM work queue for each work class of each of other FAM devices of the distributed computing system.

18. A non-transitory computer readable storage medium including instructions, that when performed by processing circuitry of a memory controller of a fabric attached memory (FAM) device, cause the FAM device to perform acts comprising:
- receiving a work packet via a fabric interconnect at a command manager (CM) of the memory controller from a second CM of another FAM device, wherein the work packet includes a memory access to be performed by a FAM computing resource local to the FAM device;
- determining a work class of the work packet;
- placing the work packet in a CM work queue local to the memory controller for the work class when space is available in the CM work queue for the work class;
- when the CM work queue for the work class is full, placing the work packet in a destination work queue according to an address included in the work packet, wherein the destination queue is implemented in a memory array of the FAM device external to the memory controller;
- providing the work packet to the FAM computing resource without sending status of the received work packet to the source device;
- receiving, in a CM response queue of the first CM, indication of completion of the work packet from the FAM computing resource of the first FAM device; and
- sending, by the first CM, a response packet to a CM response queue of the second CM.

* * * * *